Sept. 6, 1949. T. B. CLARKE ET AL 2,480,905
HEEL ATTACHING MACHINE
Filed Jan. 16, 1945 7 Sheets-Sheet 4

Inventors
Thomas Baggott Clarke
Arthur Alan Rivington
By Their Attorney

Sept. 6, 1949. T. B. CLARKE ET AL 2,480,905
HEEL ATTACHING MACHINE
Filed Jan. 16, 1945 7 Sheets-Sheet 5

Fig. 11

Inventors
Thomas Baggott Clarke
Arthur Alan Rivington
By their Attorney
Thomas Ryan Sept. 6, 1949.　　　T. B. CLARKE ET AL　　　2,480,905
HEEL ATTACHING MACHINE
Filed Jan. 16, 1945　　　7 Sheets-Sheet 7

Inventors
Thomas Baggott Clarke
Arthur Alan Rivington
By their Attorney

Patented Sept. 6, 1949

2,480,905

UNITED STATES PATENT OFFICE 2,480,905

HEEL-ATTACHING MACHINE

Thomas Baggott Clarke and Arthur Alan Rivington, Leicester, England, assignors to United Shoe Machinery Corporation, Flemington, N. J., a corporation of New Jersey Application January 16, 1945, Serial No. 573,026
In Great Britain February 4, 1944

27 Claims. (Cl. 12—19.2)

This invention is concerned with improvements in the heeling of shoes. By way of example, there is hereinafter described one convenient construction of machine which is illustrative of the invention, it being adapted for attaching a heel to a shoe in the manner disclosed in the application filed in the United States Patent Office in the names of Carr and Clarke on January 6, 1943, bearing the Serial No. 471,412. On December 25, 1945, this application matured into Patent No. 2,391,543. This is effected by so inserting nails in the heel-seat of the shoe that portions of said nails are left projecting therefrom, and then pressing the shoe and a heel together to cause the nails to enter the heel for its attachment to the shoe.

Before the heel is attached, it is desirable that it shall have formed in it a plurality of passages, the arrangement of which conforms to that of the nails in the shoe, with the object of ensuring that the nails will enter the heel properly. The formation of the passages in the heel has, in attaching heels in the manner just previously mentioned, been effected in a machine separate from that in which the heel-attaching operation is performed. When a heel having passages thus produced is placed in the attaching machine, said passages may not be in correct alinement with the nails in the shoe and the nails may not be driven into the heel correctly.

One of the various objects of the present invention is to ensure that, in attaching a heel to a shoe in the manner above described, the fasteners will be forced accurately into the heel in a more reliable and expeditious manner than hitherto. To this end, the machine of the present invention combines with a heel-supporting mechanism and a fastener-inserting mechanism, either of which mechanisms may be moved into co-operation with a shoe-support, novel mechanism whereby passages may be formed in a heel, as by pricking. When the fastener-inserting mechanism is beneath a shoe on the shoe-support, the heel-supporting mechanism is beneath the pricking mechanism and when the heel-supporting mechanism co-operates with the shoe the fastener-inserting mechanism receives fasteners from a supplying apparatus. The arrangement is such that when fasteners are being inserted in a shoe, a heel is, in the same cycle of the machine, pricked by the pricking mechanism. The heel-supporting mechanism has devices which position the heel beneath the pricking mechanism and then hold it while the heel-supporting mechanism, with the heel thereon, is moved beneath the shoe-support. The pricking devices of the pricking mechanism and inserting devices of the fastener-inserting mechanism are so arranged that when a pricked heel, thus held against movement on the heel-supporting mechanism, is carried beneath a shoe into which fasteners have been driven, the passages in the heel and fasteners in the shoe will be in alinement. Therefore the entry of the nails into the passages is assured, the heel remaining positioned on the heel-supporting mechanism until it is attached to the shoe. It will be apparent that by this invention not only are the passages in a heel located accurately and without undue attention by the operator beneath the fasteners in a shoe to which the heel is to be attached, but a considerable saving in time in the heel-attaching operation is effected, in consequence of the use of separate machines for pricking the heel and for pressing together the shoe and heel being avoided.

When the fasteners are being inserted in the shoe, the thickness of the work between the opposed pressure-applying devices is less than it is when the shoe and heel are being pressed together. Therefore, the invention also furnishes means whereby the pressure exerted on the shoe when the fasteners are being inserted is so controlled that undesirably heavy pressure, which might cause damage to the work, is avoided.

The invention further provides means which prevents the machine from being started under power if the work is not in proper position for operation thereon, said means also being so arranged that a portion of the mechanism by which a heel is supported cannot be moved relatively when said mechanism is positioned beneath the shoe-support or is being moved to such position.

In the accompanying drawings illustrating one of the several possible embodiments of the invention.

The illustrative machine, except as will hereinafter appear, is in its general construction similar to that described in Letters Patent of the United States No. 1,195,134, Gouldbourn, August 15, 1916, embodying mechanism similar to that described in the above-mentioned application. Double-pointed or headless nails are delivered to a fastener-inserting mechanism of the machine, the nails so driven into the heel-seat portion of a shoe that they project therefrom, and a heel pressed on to the projecting portions of the nails to attach the heel to the shoe. The present machine, however, has a further mechanism A arranged to prick holes in the heel, to receive the projecting portions of the nails before the heel is pressed thereon, and means whereby the pressure to which the work is subjected during the driving of the nails into a shoe and the attaching of a heel to the shoe is so controlled that unduly heavy pressure on the work is avoided.

Figure 1:
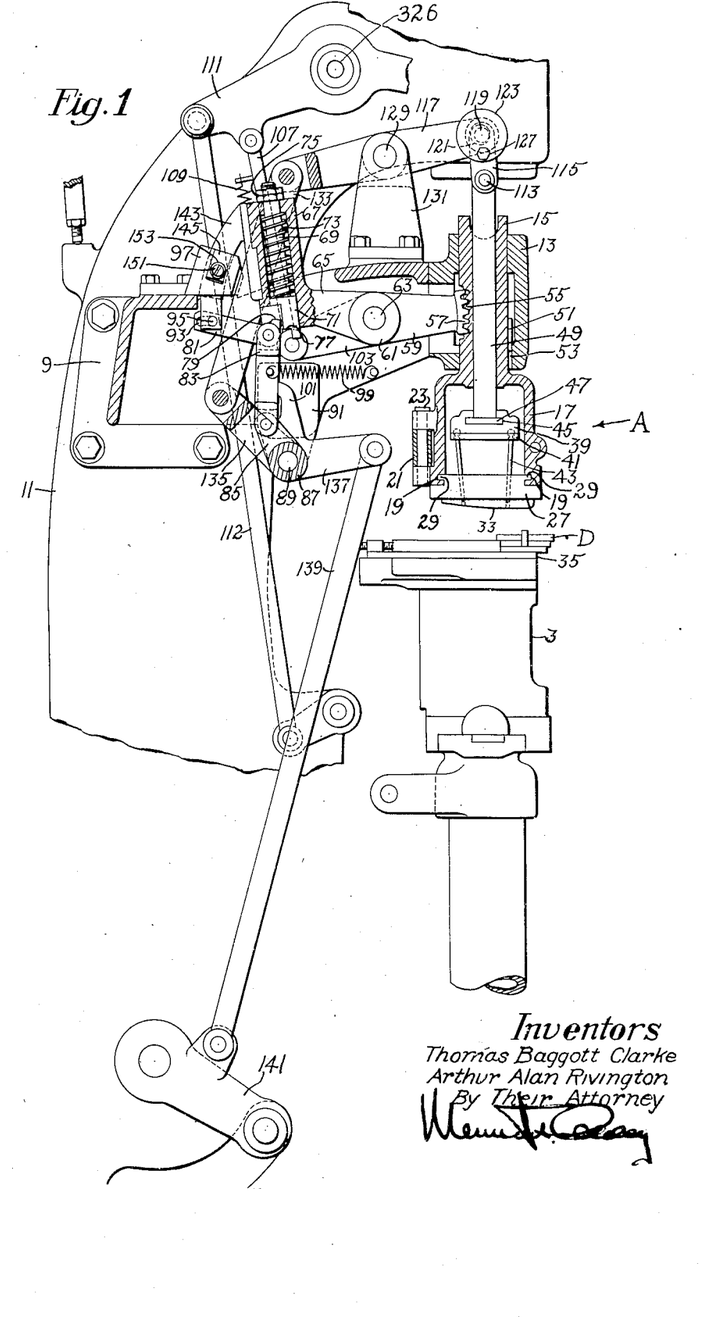
Fig. 1 is a broken left-hand side elevation, partly in section, of the machine, showing more particularly the heel-pricking mechanism.
Figure 3:
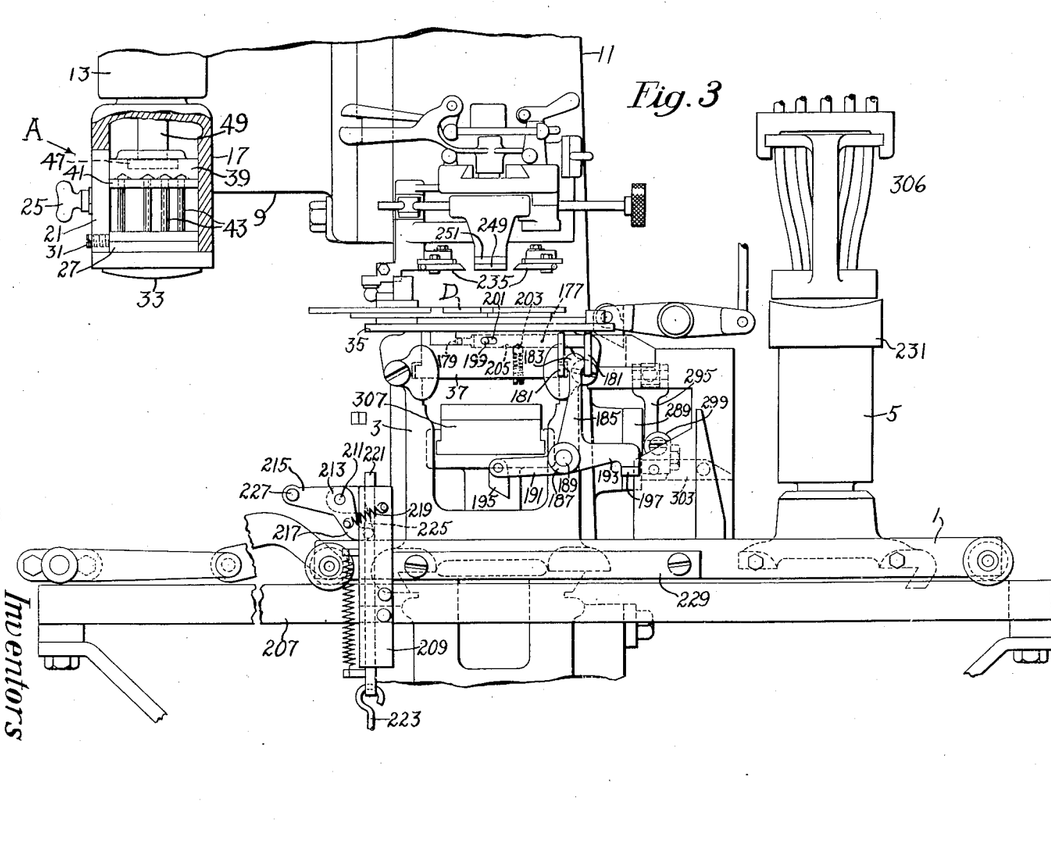
Fig. 3, a front elevation of that portion of the machine with which this invention is more directly concerned.
Figure 12:
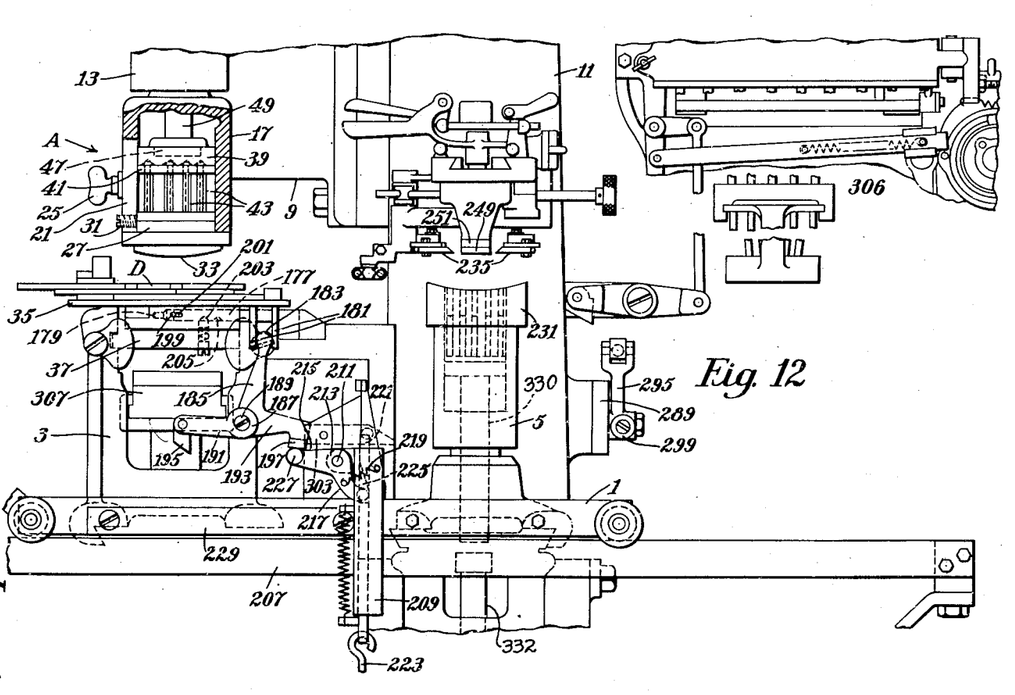
Fig. 12, a view similar to Fig. 3, but with the carrier-frame in its left-hand position and additional portions of the fastener-supplying mechanism included.
Figure 13:
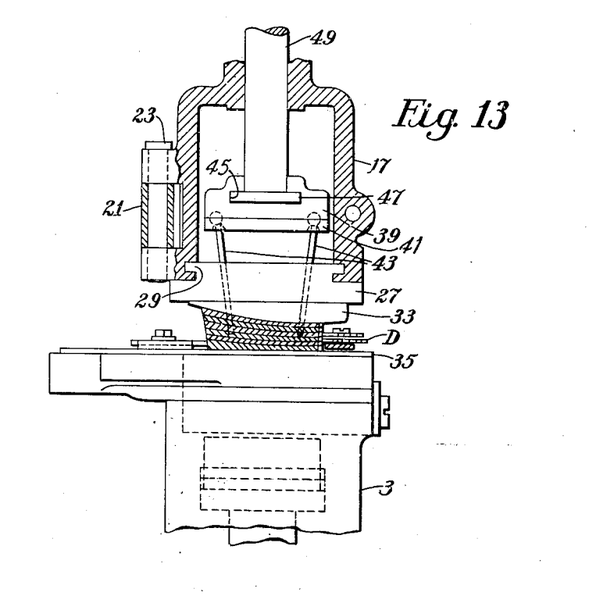
Fig. 13, an enlarged vertical section through the pricking mechanism, at the completion of its operation.
Figure 14:
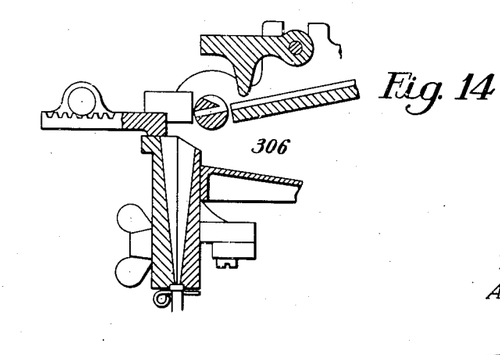
Fig. 14, a fragmentary vertical, longitudinal section through the delivery end of the fastener-supplying mechanism.

The pricking mechanism A is arranged at the left-hand side of the machine, as seen in Figs. 3 and 12. It is so positioned that when a frame 1 carrying a left-hand work-supporting mechanism 3 and a right-hand work-supporting mechanism 5 is moved to its left-hand position, a heel on the mechanism 3 is beneath pricking tools of the pricking mechanism and the mechanism 5 is directly below a last-engaging or shoe-supporting abutment 7. The pricking mechanism comprises a main bracket 9 (Figs. 1, 3 and 12) secured to the side of the machine-frame 11. A forward portion 13 of the bracket has slidingly mounted in it a vertical sleeve-portion 15 extending upwardly from a hollow pricker-head 17. This pricker-head is substantially rectangular, when viewed from above, and in the inner surfaces of its front and rear walls near the bottom thereof are formed rectangular grooves 19. The lower portion of the left-hand wall of the pricker-head is formed by a door 21 (Figs. 3, 11, 12 and 13), hinged to the head by a vertical pivot 23 (Figs. 1 and 13) and held in closed position by a readily removable screw 25. An awl-guiding block 27 is supported in the lower end of the pricker-head. It has at the front and at the rear flanges 29 arranged to slide in the grooves 19 and to be held therein by the right-hand wall of the pricker-head and an adjustable screw 31 (Figs. 3 and 12) in the door. Below the flanges 29 the block 27 has outwardly extending portions which engage the lower face of the pricker-head. The lower face 33 of the block 27 is convex and is arranged to engage the upper concave face of a heel and to clamp the heel during the pricking operation. The block has formed in it a plurality of awl-guiding holes, which, if a man's shoe-heel is being operated upon, are usually vertical, but, if it is a woman's shoe-heel, usually slope downwardly and inwardly at a small angle to the vertical, so that the holes are inclined similarly to the curved periphery of the heel.

In the work-supporting mechanism 3 a pressing plate, on which a heel rests on its tread-face, is made in two parts. An upper part 35, which supports the heel and carries work-holding and -positioning devices D, is slidably mounted on a lower part 37 (Fig. 3), so that the upper part may be moved forward from beneath the pricker-head and held in this position, while a heel is placed thereon in the devices D.

Enclosed within the pricker-head 17 is an awl-carrying block 39 having secured to its lower face a plate 41 having a number of holes through each of which passes an awl 43, comprising a relatively thin rod having a point on its lower end and a head on its upper end. The heads of the awls are received in recesses in the block 39 and are supported by the plate 41, the holes in which are large enough to allow the awls to have some slight lateral swinging movement. The block 39 has formed in its upper portion a guideway 45 extending laterally of the machine, and which is arranged to receive a head 47 on the lower end of a vertical awl-spindle 49 guided in the sleeve 15 of the pricker-head. When the door 21 on the pricker-head is opened, the guide-block 27, carrying block 39 and awls 43, then in the head, may be removed bodily by merely sliding them from said head and from the head 47 on the spindle 49. They may then be replaced by a guide-block, carrying block and awls corresponding to a different pricking design. The sleeve-portion 15 of the pricker-head has a key 51 (Fig. 1), arranged to slide in a keyway 53 in the portion 13 of the main bracket 19 to prevent the pricker-head from rotating. At the rear of the sleeve-portion are rack-teeth 55 engaged by a gear-segment 57 on the forward end of an arm 59 of a pricker-head-lever 61. This arm is secured on a horizontal spindle 63 extending laterally of the machine and rotatably mounted in the main bracket 9.

The lever 61 has a rearwardly extending arm 65 on which is an upwardly extending boss 67. Slidably mounted in a bore in the boss 67 and extending lengthwise thereof is a pricker-head-actuating rod 69. The rod has a head 71 at its lower end and a reduced portion extending upwardly from the head through the boss. The bore in the boss has one portion in which the head 71 is movable and a reduced upper portion in which the rod is movable, there being a compression-spring 73 in the bore surrounding the rod. This spring engages the head 71 and a shoulder formed by the reduced portion of the bore and urges the rod 69 downwardly. The rod above the boss is threaded and has on it a nut and a locknut 75 which limit its downward movement. The forward end of the head has a shoulder 77 which is arranged to be engaged by a projection 79 on the forward end-portion of a rearwardly extending link 81, pivoted to the upper end of a pricker-head-actuating toggle-link 83. The lower end portion of the toggle-link is pivotally connected to a toggle-arm 85 of a pricker-head-actuating lever 87. The lever 87 has a hub, from which the arm 85 extends upwardly, it turning about a horizontal spindle 89 extending laterally of the machine and secured in brackets 91 (Figs. 1 and 4) fixed to the bracket 9 of the pricker mechanism. The arm 85 of the lever 87 and link 83 form a toggle, which when straightened, as hereinafter described, causes, through the rod 69, spring 73, pricker-head-lever 61 and gearing 57, 55, the awl-block 27 to be pressed against a heel on the plate 35 of the work-supporting mechanism 3.

Figure 6:
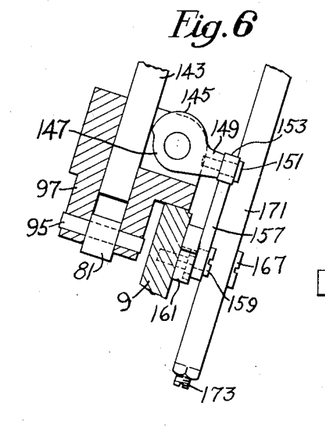
Fig. 6, a rear view, partly in section, of the mechanism of Fig. 5.

The rear portion of the link 81 has a substantially horizontal slot 93, through which passes a horizontal pin 95, secured in a bracket 97 (Figs. 1 and 6) on the bracket 9 to support and guide the rear end of the link. The toggle-link 83 has connected to it one end of a tension-spring 99, the other end of which is secured to the bracket 9 and is arranged to pull the upper end of the toggle-link and link 81 forward to position the projection 79 on the latter link beneath the shoulder 77 on the head 71 of the pricker-head-actuating rod 69. The pricker-head-actuating lever 87 has another upwardly extending arm 101 in front of the toggle-arm 85. This is arranged to engage the front of the toggle-link 83 near the lower end thereof, and, as the toggle is broken, to move the upper end of the toggle-link 83 and the link 81 rearwardly to shift the projection 79 on the latter link from beneath the shoulder 77 on the head 71 of the pricker-head-actuating rod.

Figure 2:
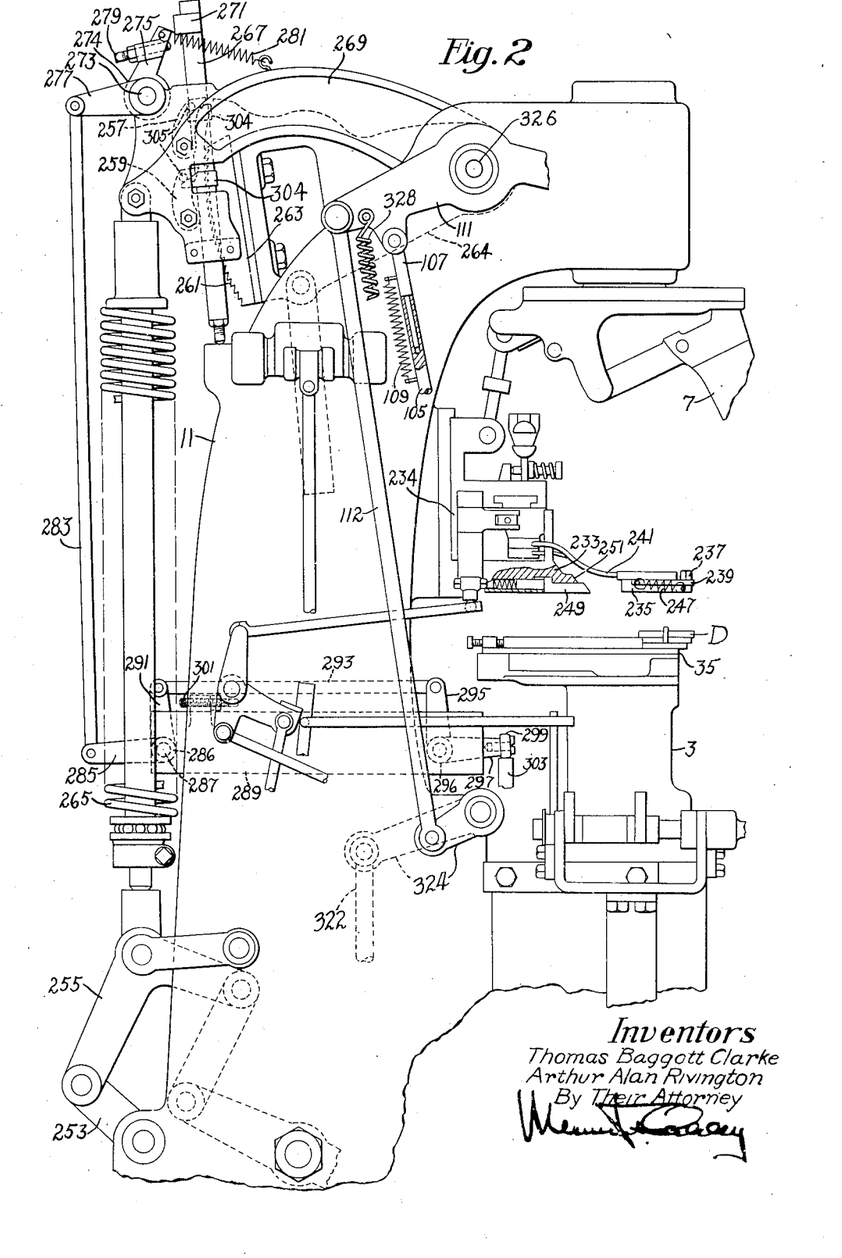
Fig. 2, a similar view, showing more particularly the pressure-controlling mechanism.
Figure 7:
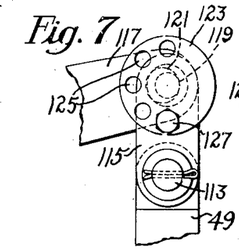
Fig. 7, a left-hand side elevation of adjusting means of the pricking mechanism.
Figure 8:
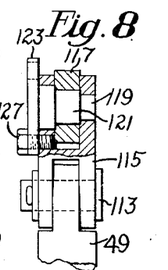
Fig. 8, a front elevation, partly in section, of the mechanism of Fig. 7.

The pricker-head 17 is first moved down to cause the awl-guiding block 27 to engage a heel on the work-support 3 by treadle-operated means. This means comprises a rearwardly extending arm 103 fast on the spindle 63 to which the pricker-head-lever 61 is secured. The end of the arm 103 has pivotally connected to it a two-part link, comprising a lower portion 105 and an upper portion 107 (Figs. 1 and 2) slidingly mounted in the lower portion and connected by a tension-spring 109. The upper end of the portion 107 is pivotally connected to a lever 111, by which the shoe-supporting abutment 7 is depressed, as in the previously mentioned patent, through a link 112 joined to an unillustrated treadle 114. When the treadle 114 is depressed, the pricker-head 17 is moved downwardly through the abutment-lever 111, the link 105, 107 and pricker-head-lever 61, until the awl-guiding block 27 engages a heel on the work-supporting mechanism 3. During this movement of the lever 61, the boss 67 and the pricker-head-actuating rod 69 are moved upwardly, and this upward movement causes the shoulder 77 on the head 71 on the rod to lie at a higher level than the projection 79 on the link 81, so that the projection may be moved beneath the shoulder in readiness to cause , as hereinbefore described, the awl-guiding block 27 to be pressed against the heel by power-operated means. The upper end of the awl-spindle 49 is pivotally connected by a pin 113 to a link 115 pivoted to the forward end of an awl-actuating lever 117. The pivotal connection between the lever 117 and link 115 (Figs. 7 and 8) comprises a stud 119 rotatably mounted in the link 115 and having an eccentric portion 121 mounted in the lever 117. The stud 119 has a relatively large disc-like head 123, having around it a plurality of holes 125 through any one of which a screw 127 may be passed and threaded into the link 115. By removing the screw 127 and rotating the stud 119 the height of the awls may be adjusted relatively to the lever 117, and since this lever has a definite amount of movement during operation of the machine, the depth of the holes in the heel is correspondingly varied.

The lever 117 is pivoted about midway on a horizontal stud 129 carried by a bracket 131 secured to the main bracket 9. The rear end of the lever has two arms each of which is pivotally connected to the upper end portion of a toggle-link 133 (Fig. 4) of an awl-actuating toggle-lever. The lower end portion of each toggle-link 133 is pivotally connected to the upper end of an arm 135 extending from the hub of the pricker-head-actuating lever 87. The lever 87 has an arm 137 to which is pivotally connected the upper end of a rod 139, the lower end of which is pivoted to an arm 141 movable under the power of the machine when clamping pressure is applied to the work, as in the Gouldbourn patent. When, therefore, the machine is being operated by power, the toggle, comprising the links 133 and arms 135, is straightened, to cause the awls 43 to prick the heel, after the guide-block 27 has been pressed firmly against the heel, as later described.

Figure 4:
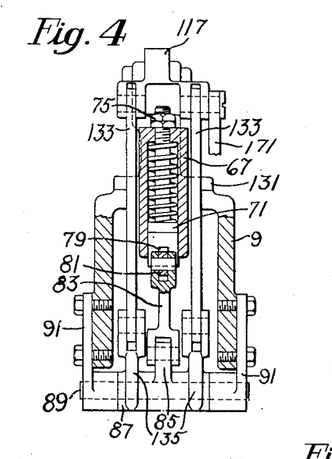
Fig. 4, a rear elevation, partly in section, of some of the pressure-controlling mechanism shown in Fig. 1.
Figure 5:
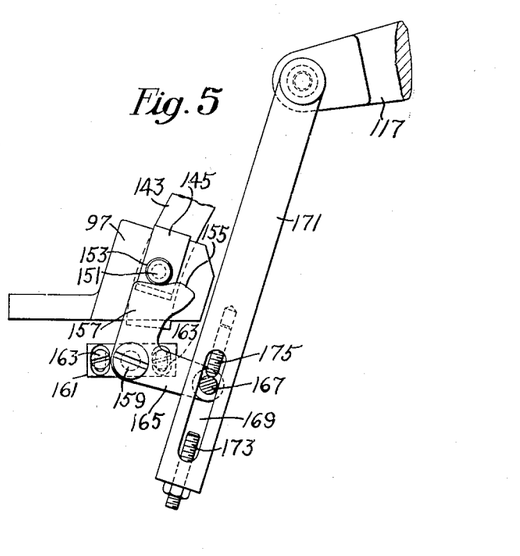
Fig. 5, a left-hand side elevation of the locking arrangement for the pricking mechanism.

As the downward movement of the awls to prick the heel is nearly completed, the pricker-head 17, after it has been pressed by the power-operated mechanism against the heel, is locked against upward movement. The lock remains operative until the awls have been withdrawn from the heel, to prevent the heel from being lifted from the work-support 3 as the awls are moving upwardly after their pricking action. The mechanism for locking the pricker-head comprises an arm 143 (Figs. 1, 5 and 6) projecting downwardly from the boss 67 at the rear of the pricker-head-lever 61. Arranged to engage the left-hand side face of the arm 143, viewing the machine, from the front, is an eccentric face 145 on a locking lever 147 pivoted on the bracket 97. The lever 147 has an arm 149 extending toward the left and the eccentric face 145 is so arranged that upward movement of this arm 149 causes the eccentric face to wedge against the arm 143. The opposite face of the arm 143 bears against the bracket 97 and the engagement of the eccentric face prevents downward movement of the arm and therefore upward movement of the pricker-head 17. The arm 149 of the locking lever 147 has extending from it a stud 151 on which is mounted a roll 153. The roll 153 is engaged by a cam-face 155 on a cam-lever 157 pivoted on a stud 159 secured in a plate 161 fixed to the bracket 9 by screws 163. These screws pass through slots in the plate, so it and the cam-lever may be adjusted upwardly or downwardly. The cam-lever has an arm 165 in which is secured a stud 167 passing through a slot 169 in the lower portion of a lock-actuating link 171. The upper end of the link is pivoted to the rear end of the pricker-actuating lever 117 (Figs. 4 and 5). The slot 169 has extending into it two screws 173 and 175, so arranged that just before the awls complete their pricking movement the screw 173 at the lower end of the slot engages the stud 167 in the lever 157 and causes the lock to become effective. When the awls have been withdrawn from the heel, the screw 175 in the upper end of the slot engages the stud 167 and operates the locking lever to release the lock. The screws 173, 175 may be adjusted to vary the time of applying and releasing the lock.

The pricking mechanism operates in the following manner. When the machine comes to its stopped position after having caused a heel to be attached to a shoe, the work-supporting mechanism 3 will be in its right-hand position (Fig. 3), to which it was previously moved with a pricked heel, now attached to the shoe. Unjacking the heeled shoe, the operator moves the carrier-frame 1 to shift the mechanism 3 to its left-hand position, beneath the awls 43, the pricker-head 17 and awls being raised. He draws forward the upper part 35 of the pressing plate of the mechanism 3 and places on it an unpricked heel, tread-face down, in the work-holding devices. He then moves the part 35 of the pressing plate rearwardly to carry the heel beneath the pricker-head. When, thereafter, the operator depresses the treadle of the machine, the pricker-head is moved down by its connection to the abutment-lever 141, as already described, to cause the awl-guiding block 27 to engage the upper face of the heel and to force the heel against the pressing plate. This movement of the pricker-head-lever 61 causes the boss 67 on the rear of the lever to be raised, so that the shoulder 77 on the head 71 of the rod 69 in the boss is at a higher lever than the projection 79 on the link 81 at the rear of the rod. When the machine is operated by power, after the treadle has been further depressed to start the machine, the pricker-head-actuating lever 87 is turned clockwise by its connection to the arm 141. The upwardly extending arm 101 of the lever is moved away from the toggle-link 83 and allows the tension-spring 99 to carry the toggle-link and the link 81 forward to position the projection 79 on the link beneath the shoulder 77. As the pricker-head-actuating lever 87 continues its clockwise movement, the pricker-head-actuating toggle-lever 83, 85 and awl-actuating toggle-lever 133, 135 are straightened. The arrangement is such that the pricker-head-actuating lever causes the awl-guiding block 27 in the pricker-head to be pressed firmly against the heel just before its pricking by the awls 43 commences. As the awl-actuating toggle-lever is approaching its straightened condition, the pricker-head-actuating toggle-lever passes slightly beyond this point. The awls, as they are moved from their fully raised position, travel a slightly greater distance before they engage the heel than they do when they are actually pricking the heel, and the pricker-head-actuating toggle-lever is so arranged that pressure is applied by the pricker-head to the heel before the awls enter the heel. The full pressure of the pricker-head is effective before the awls complete their pricking movement. At this time, and while the pricker-head is being fully pressed against the heel, the locking eccentric 145 prevents upward movement of the pricker-head and heel while the awls are rising. The lock remains effective until the awls have been withdrawn from the heel and the awl-actuating toggle-lever 133, 135 is nearing its fully broken condition. As the lever 133, 135 is being broken the pricker-head-actuating toggle-lever 83, 85 is also being broken, and before the lock is released the projection 79 on the link 81 is moved rearwardly from beneath the shoulder 77, so that the pricker-head may return to its raised position when the treadle of the machine is released by the operator. As the pricker-head is raised, the boss 67 and rod 69 are lowered, and the shoulder 77 returns to a position lower than the projection 79.

The illustrative machine is provided with mechanism for preventing it from being started under power unless the upper part 35 of the pressing plate of the supporting mechanism 3 is fully in operating position, and for preventing the part 35 from being pulled forward when the mechanism 3 is being moved to or is in its right-hand position, in which a pricked heel thereon is attached to a shoe. This mechanism comprises a horizontal locking rod or bar 177 (Fig. 3) extending laterally of the machine, which is slidingly mounted in the part 37 of the pressing plate. Its left-hand end is arranged to enter a recess 179 in the part 35 in its rearward position, to prevent said part from being moved forward. The locking rod 177 has extending downwardly from its right-hand end a pair of flanges 181, between which is a rounded upper end 183 of an arm 185 of a three-armed lever 187. This lever is pivoted on a horizontal forwardly and rearwardly extending stud 189 secured in the mechanism 3, and has a second arm 191 extending to the left and a third arm 193 extending to the right. The arm 191 has pivoted to its left-hand end a depending latch 195, which can swing freely in a clockwise direction from its depending position but cannot swing in a counterclockwise direction, owing to its right-hand side face being engaged by a face on the arm 191. The lower face of the latch 195 is inclined upwardly toward the left. The right-hand end of the arm 193 has secured to its underside a hardened block 197. The rod 177 has in it a pin 199 arranged to engage the ends of a slot 201 in the lower part 37 of the pressing plate. The length of the slot is such that when the pin is in engagement with one end, the left-hand end of the rod 177 is in the recess 179 in the part 35 of the pressing plate and prevents said part from being moved forward. When the pin is in engagement with the other end of the slot, the left-hand end of the rod is out of the recess and the part 35 may be moved forward. As the lever 187 is swung on its pivot to move the rod from one position to the other, a spring-plunger 203 movable in the mechanism 3 engages one or the other of two recesses 205, 205 in the rod to hold it yieldably in position. Secured to a guide-rail 207 for the carrier 1 is a casing 209, which is at the right of the mechanism 3 when the latter is in its left-hand position. The casing 209 has pivoted to a lug on its left-hand side, on a horizontal forwardly and rearwardly extending pin 211, a control-lever 213, having a substantially horizontal arm 215 extending to the left and a downwardly extending arm 217. The arm 215 of the control-lever has a rounded end arranged to engage the underside of the block 197 on the arm 193 of the lever 187. The arm 217 has its lower end portion bent to the right to enter an opening in the casing. The end of the bent portion is rounded and is held by a tension-spring 219, connected to the control-lever and to the casing, against the left-hand face of a vertical bar 221 slidably mounted in the casing and connected by a link 223 to the treadle of the machine. This bar 221, with the co-operating bar 229 on the carrier-frame 1, furnishes the safety-latch of the previously mentioned Patent No. 2,391,543, which prevents depression of the machine-treadle unless the carrier-frame is in one or the other of its operating positions. In the left-hand face of the bar 221 is a recess 225, having a bottom face inclined upwardly and to the left, which the rounded end-portion of the arm 217 of the control-lever 213 enters when the treadle and bar are in their fully raised position.

As the mechanism 3 is moved from its right-hand position beneath the shoe-abutment 7 to its left-hand position beneath the pricker-head, the inclined edge of the latch 195 on the arm 191 of the lever 187 engages and passes over a pin 227 projecting from the horizontal arm 215 of the control-lever. Since the latch 195 cannot turn in a counterclockwise direction, the lever 187 is rotated clockwise and draws the rod 177 out of the recess 179 in the upper part 35 of the pressing plate. When the mechanism 3 is in its left-hand position, the block 197 on the arm 193 of the lever 187 is just above the rounded end of the arm 215 of the control-lever 213 and the end of the downwardly extending arm 217 of the control-lever is in the recess 225 in the bar 221. The part 35 of the pressing plate may now be drawn forward to receive a heel, and at this time the recess 179 in the part 35 moves forwardly of the end of the rod 177, and the rod is prevented by a vertical face on the plate from moving toward the left. If, when the upper part of the pressing plate is in its forward position or has not been moved fully rearward, the operator attempts to depress the treadle, the inclined face at the bottom of the recess 225 in the bar 221 presses against the end of the arm 217 of the control-lever 213, and causes the rounded end of the arm 215 of the control-lever to be urged against the block 197 on the arm 193 of the lever 187. Through said lever, this presses the end of the rod 177 against the face on the upper part 35 of the pressing plate. The treadle is thus prevented from being depressed and the machine from being started. If, however, the part 35 is in its fully rearward position, the recess 179 therein will register with the rod 177, and when the treadle is depressed to start the machine, the inclined face at the bottom of the recess 225 will, through the control-lever 213 and lever 187, push the left-hand end of the rod into the recess in the upper part of the pressing plate. The upper part is thus locked against forward movement and the machine may be started. The spring-plunger 203 holds the lever 187 and rod 177 in this position while the supporting mechanism 3 is moved to its right-hand position. During such movement the latch 195 moves idly over the pin 227 of the control-lever 213, with the result that while the supporting mechanism 3 is moved to and is in its right-hand position the part 35 of the pressing plate is locked against forward movement. This mechanism therefore ensures that the part 35, with the applied heel, will be in the proper position beneath the awls before they can be operated to prick the heel, and that the part 35 and the pricked heel cannot be displaced after they have left the pricking position.

The shoe-supporting abutment or jack 7 of the machine may be caused to press the heel-seat of a shoe against a top-plate or nailing die 231 on the mechanism 5 or against a heel held upon the plate 35 of the mechanism 3, first by means of a treadle and then by power means, as described in the previously mentioned application.

Figure 9:
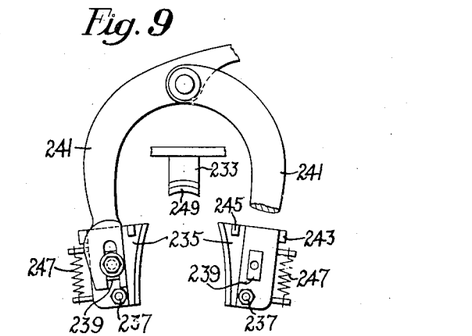
Fig. 9, a broken plan view of shoe-holding mechanism.
Figure 10:
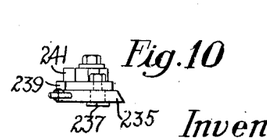
Fig. 10, a front elevation of a part of the mechanism shown in Fig. 9.
Figure 11:
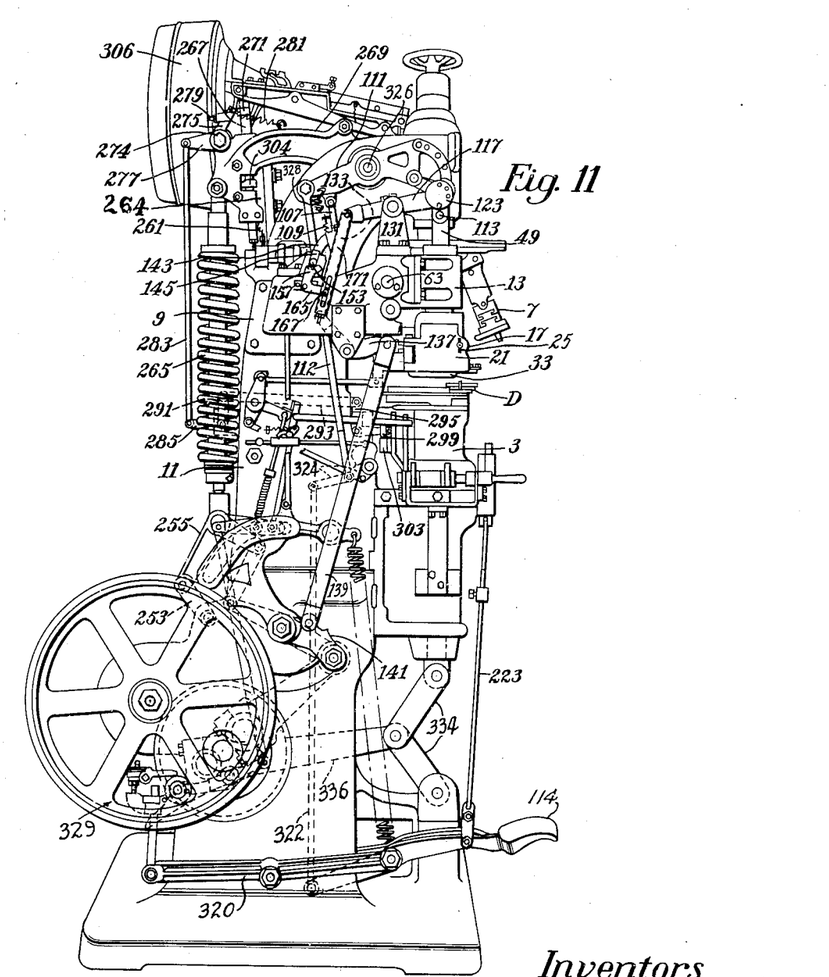
Fig. 11, a side elevation of the complete machine, viewed from the left in Fig. 3.

The machine has means for positioning a shoe on the abutment 7, which includes a device arranged to engage the crease formed between the upper and a sole member at the rear of the shoe and devices arranged to engage the crease at each side of the heel-portion of the shoe. The device which engages the crease at the rear of the shoe comprises a block 233 (Figs. 2 and 9) which is supported in a bracket 234 sliding upon the frame in the same manner as that in Letters Patent of the United States No. 2,259,568, Kestell, October 21, 1941. The devices at the sides of the heel-portion of the shoe comprise members 235, 235 (Figs. 9 and 10) shaped to enter the crease and engage the upper, these being supported so that they may each pivot about a vertical axis. The pivots are furnished by bolts 237 secured to blocks 239 which are adjustable along slots in the pivoted arms 241. The members 235 have extending upwardly from them lugs 243, 245 arranged to engage the blocks 239. Springs 247 normally hold the lugs 243 against the blocks, with the rear portions of the members 235 in an inward position. Here they provide convenient means for guiding the crease of a shoe when it is being presented to the machine, it engaging the rear portions to displace them outwardly as the shoe is pushed to the rear. As the arms 241 are closed to clamp the shoe, the blocks 239 engage the lugs 245 and press the rear portions into the crease. The machine has means, similar to that described in said Patent No. 2,391,543, for preventing the arms 241 from opening when the machine comes to rest after the heel has been pricked, the nails have been driven into the shoe and the treadle released. This is to ensure that the shoe will not be displaced while the heel is moved beneath it to be pressed on the inserted nails. The block 233, which engages the rear of the shoe, has slidably mounted in it a crease-engaging portion 249 which can yield rearwardly (Fig. 2), and the block has on it just above the yielding portion a face 251, arranged to engage the rear of the upper just above the crease and to position the shoe lengthwise in the machine. When a shoe is presented to the machine, it may be positioned heightwise therein by engagement of the crease with the portion 249, and may then be pushed rearwardly until the upper engages the face 251 and is positioned lengthwise thereby. The provision of the yielding portion 249 prevents a shoe, in which the sole may not be firmly secured, from being pushed too far back in the machine owing to the crease-engaging block wedging between the sole and shoe. The present arrangement provides means whereby the shoe may be correctly located heightwise and a solid abutment whereby the shoe may be located lengthwise.

In order to enable the shoe-supporting abutment 7 to have sufficient power-operated movement to press on a pricked heel, a shoe from which the heel-attaching nails project, a toggle-lever comprising toggle-links 253, 255 (Fig. 2) is arranged to give a downward movement to the abutment of about five-eighths of an inch, to force the nails into the heel and then to press the shoe and heel together at the mechanism 3. When, however, the heel-attaching nails are being inserted into the heel-seat of a shoe, the shoe is first moved down by the abutment into engagement with the mechanism 5, which drives the nails, before the machine is operated by power. In this machine work-clamping pressure is applied to the abutment by mechanism similar to that of the Gouldbourn patent. If a pair of actuating pawls 257, 259, pivoted upon a pressure-lever 269 which is oscillated through the spring 265 by the toggle-lever 253, 255, were allowed to engage the teeth 261 of a work-measuring ratchet-segment 263, carried by a plunger or shoe-support actuating lever 264 which reciprocates the abutment 7, almost as soon as the power-operation of the machine commenced, the full stroke of the toggle-lever would be effective to compress the spring 265. Therefore, a force so heavy would be applied to the last at the mechanism 5 that it would be likely to damage it and perhaps the shoe. To prevent this, the illustrative machine is provided with mechanism whereby the actuating pawls 257, 259 are held out of engagement with the ratchet-teeth 261, when the machine is inserting the attaching nails in a shoe by the mechanism 5, until some of the straightening movement of the toggle-lever has taken place. They are then allowed to engage the ratchet-teeth, so that the spring 265 during the remainder of the straightening of the toggle is compressed. When a heel is being attached to the shoe by the mechanism 3, the pawls are allowed to engage the ratchet-teeth almost as soon as the toggle-lever commences to straighten, so that during the straightening of the lever the shoe is pressed downwardly first to force the nails into the heel, during which the spring 265 may be slightly compressed, and then, when the heel-seat of the shoe is being forced against the heel, the spring is compressed or further compressed and a relatively heavy pressure is applied to the work through the spring.

In the present machine the actuating pawls 257, 259 are controlled by the slider 267 movable upon the pressure-lever 269. The slider now extends above the pressure-lever and has secured to it above the lever a rearwardly projecting block 271. Further, the pressure-lever has pivoted to it, by a horizontal pin 273, a control-pawl 274 including an upwardly extending arm 275 and a rearwardly extending arm 277. The arm 275 of the control-pawl is arranged to engage the underside of the block 271, and a screw 279 extending through the arm is urged by a tension-spring 281 against the slider to limit movement of the arm 275 toward it. When, during operation of the machine, the arm 275 of the control-pawl is beneath the block 271, the pressure-lever 269, slider 267, control-pawl 274 and actuating pawls 257, 259 move upwardly together, and the actuating pawls are held by the slider out of engagement with the ratchet-teeth 261 on the ratchet-segment 263. The arm 277 of the control-pawl has pivotally connected to it a downwardly extending rod 283, the lower end of which is pivoted to a rearwardly extending arm 285 of a bell-crank-lever 286 which is pivoted on a horizontal pin 287 rotatably mounted in a bracket 289 secured to the right-hand side of the machine-frame. The bell-crank-lever has an upwardly extending arm 291 which has pivotally connected to it a forwardly extending rod 293 pivoted to an upwardly extending arm 295 (Figs. 2 and 3) of a cam-lever 296. This lever is pivotally mounted on the bracket 289 and has a forwardly extending arm 297 carrying a cam-roll 299. The bracket 289 has in it a screw 301 (Fig. 2) arranged to limit forward movement of the arm 291 of the bell-crank-lever 286.

The carrier-frame 1, on which the mechanisms 3 and 5 are mounted, has a cam 303 (Fig. 3) arranged to engage the underside of the cam-roll 299 and raise it to withdraw the arm 275 of the control-pawl 274 from beneath the block 271 on the slider 267, as the carrier-frame moves to the right to carry a heel on the mechanism 3 beneath a shoe on the abutment 7 for attachment. The actuating pawls 257, 259, when the carrier-frame is in this position, are therefore allowed to move into engagement with the ratchet-teeth 261 to apply pressure to the work through the abutment almost as soon as the machine commences to operate by power. When, however, the carrier-frame is in its left-hand position, during which a heel is pricked and nails are driven into a shoe to which the heel is to be attached, the cam 303 on the carrier-frame has passed from below the cam-roll 299 on the cam-lever 296, and the tension-spring 281 has moved the arm 275 of the control-pawl beneath the block 271 on the slider 267. At this time, the screw 301 in the bracket 289 is usually a little distance from the arm 291 of the bell-crank-lever 286. When the machine is operated by power, the rear end of the pressure-lever 269, the slider 267, the control-pawl 274 and the actuating pawls 257, 259 all rise together, with the actuating pawls held out of contact with the ratchet-teeth 261 by the engagement of tripping devices 304 on the slider with pins 305 in the pawls. During this movement of the pressure-lever 269, the bell-crank-lever 286 is, by its connection to the control-pawl 274, rotated forwardly until its arm 291 comes into contact with the screw 301. During continued movement of the pressure-lever, therefore, the rear end of the arm 277 of the control pawl is held from upward movement, and, as the pivot 273 of the control-pawl moves upwardly, the arm 275 of the pawl is moved from beneath the block 271 to free the slider 267 and the actuating pawls 257, 259 are drawn forward by their springs (not shown) into engagement with the ratchet-teeth 261. After the actuating pawls have engaged the ratchet-teeth, reduced pressure is applied through the spring 265 to the work through the shoe-supporting abutment.

The time in the upward movement of the pressure-lever 269 at which the actuating pawls 257, 259 engage the ratchet-teeth and transmit pressure to the work, may be varied by adjusting the screw 301 in the bracket 289. If, on the one hand, this screw is adjusted so far forward that the arm 291 of the lever 286 does not, as the pressure-lever rises, come into engagement with the screw, then the arm 275 of the controlling pawl will not be withdrawn from beneath the block 271 on the slider 267 and the actuating pawls will not engage the ratchet-teeth and no pressure, except that applied by the operator through the treadle, will be placed upon the work. If, on the other hand, the screw 301 is adjusted so far rearwardly that the arm 275 of the control-pawl is withdrawn thereby from beneath the block so the actuating pawls engage the ratchet-teeth just after the pressure-lever commences to be moved upwardly, relatively heavy pressure will be exerted on the work through the spring 265, during almost all the straightening of the toggle-links 253, 255. It will therefore be realized that the pressure applied to the shoe while the nails are being driven therein may readily be adjusted. The arrangement is preferably such, however, that the pressure is usually less when the nails are being inserted than when the heel and shoe are being pressed together.

The treadle 114 for actuating the power operated mechanism of the machine is pivoted upon a clutch lever 320 (Fig. 11) fulcrumed upon the machine frame. Depression of the treadle 114 causes, through a rod 322, clockwise movement of a multi-armed lever 324 (Figs. 2 and 11) which is fulcrumed on the machine frame and is connected by the rod 112 to the rear end of the lever 111 which is secured to a shaft 326 rotatably mounted in the machine frame. A spring 328, upper and lower ends of which are secured to the lever 111 and to the machine frame respectively, constantly urges the treadle 114 to its raised idle position. The lever 111 is operatively connected to the pricker head 17 and the shaft 326 has secured to it the plunger or shoe-support actuating lever 264 through which the shoe positioning and supporting means are actuated.

When preliminary pressure has been applied to the work in the machine upon initial depression of the treadle 114, further downward movement of the treadle causes clockwise movement of the clutch treadle 320 with the result that a clutch 329 is tripped to actuate power driving mechanism through a cycle. When the clutch 329 is tripped, power actuating mechanism operating through the arm 141 causes the actuation of the pricking mechanism and power operating mechanism substantially identical with that disclosed in said Patent No. 1,195,134 causes, through the lever 111 and the toggle levers 253, 255, the actuation of the shoe positioning and shoe supporting member.

A nail driver 330 (Fig. 12), which is mounted for vertical reciprocation in the nailing die 231, is actuated by a plunger 332 operatively connected at its lower end to the upper end of a toggle 334 (Fig. 11) operatively connected to an arm 336 which upon actuation of the clutch 329 is operated in timed relation with the other power driven mechanism of the machine. The fastener inserting mechanism of the machine is identical with that disclosed in said Patent No. 1,195,134 and need not be further described herein.

In describing the operation of the illustrative machine, it will be assumed that a heel has been attached to a shoe and the fastener-inserting mechanism 5 is in its right-hand position beneath an apparatus 306, from which such fasteners as nails have been delivered to said mechanism. The operator removes the heeled shoe from the machine and moves the carrier-frame 1 to the left-hand position, in which the heel-supporting mechanism 3 is beneath the pricker-head 17 and the mechanism 5 is beneath the shoe-supporting abutment 7 (Fig. 12). He then positions a lasted shoe on the abutment and a heel on the mechanism 3 and depresses the treadle. This causes the block 27 of the pricker-head to be pressed against the heel (Fig. 13) and the abutment to press the shoe against the top-plate 231 of the mechanism 5. The pricker-head is arranged to engage the heel before the abutment presses the shoe against the top-plate, and during continued movement of the treadle after the pricker-head has engaged the heel, the parts of the two-part link 105, 107 yield relatively lengthwise of the link. The operator continues the depression of the treadle to cause the machine to be operated by power. During the power-operation, the pricker-head 17 is pressed firmly against the heel and is locked against upward movement by the eccentric 145 (Figs. 1, 5 and 6) operated through connection to the awl-actuating lever 117. The abutment 7 presses the shoe firmly against the top-plate 231. The heel is pricked and the nails driven into the heel-seat of the shoe, the pricking of the heel being performed just before the nails are driven. After the machine comes to rest, with the pricker-head 17, abutment 7 and shoe raised, the operator, without displacing the pricked heel on its support or the shoe on the shoe-supporting abutment, or changing the position of said abutment, moves the carrier-frame 1 to shift the mechanism 3 and 5 to their right-hand positions (Fig. 3). Here, the fastener-delivering mechanism 306 is actuated and nails are delivered to the mechanism 5 for insertion in the next shoe. The pricked heel is now positioned beneath the shoe, into the heel-seat of which the nails have been driven in an arrangement which corresponds to the pricked holes in the heel and in alignment therewith. The operator then again depresses the treadle, and moves the abutment 7 and shoe downwardly to cause the ends of the nails to enter the pricked holes in the heel. The ends of the nails are pressed by the treadle-action into the holes about one-eighth of an inch before the spring-pressed strut mechanism of the clutch of the machine is straightened and the clutch engaged. While the abutment 7 is being moved downward by the operator, the pricker-head 17 is also moving idly. When the machine is thereafter operated by power, the awls are actuated idly, but although they project beyond the bottom of the block 21, injury to the operator is unlikely. This is because the work-supporting mechanism 3 has been moved from beneath the pricker-head 17, so the operator's hands cannot be caught beneath the head or the awls. In the power-movement of the abutment 7 the nails are forced into the heel, and the toggle 253, 255 causes the spring 265 to be compressed or further compressed. Relatively heavy pressure is applied to the heel and shoe, as compared with that placed upon the shoe during the insertion of nails in the heel-seat. Thereafter, the pressing plate 35, 37 is moved upwardly to apply further pressure to the shoe and heel, which pressure may be varied by introducing plates of different thickness between the pressing plate and a block 307 by which it is carried (Fig. 3). The machine comes to rest with the heel attached to the shoe and the abutment 7 and the mechanisms 3 and 5 in the positions which they occupied at the commencement of the operation (Fig. 3). The depth to which the ends of the nails are inserted in the heel when the operator depresses the treadle, before causing the machine to be operated by power, may be varied by adjustment of the force of the spring of the clutch mechanism, so that greater or less effort is required in tripping the clutch and therefore more or less pressure is applied to the shoe before the clutch is tripped.

The pricking machine disclosed herein is the subject-matter of a divisional application Serial No. 775,286, filed September 20, 1947.

Having described our invention, what we claim as new and desire to secure by Letters Patent of the United States is:

1. In a heel-attaching machine, pricking mechanism, a support for a heel, a support for a shoe, mechanism for driving fasteners into the heel-seat of a shoe mounted upon the shoe-support and for leaving portions of said fasteners extending beyond said heel-seat, means for effecting relative movement of the pricking mechanism and the heel-support to form passages in a heel upon the heel-support, means for moving the heel-support in a predetermined path from a position in which it supports the heel during the passage forming operation to a position adjacent to the shoe-support, and means for effecting relative movement of the shoe-support and the heel-support in a path disposed at an angle to the first-named path to attach the heel to the shoe with the projecting nails registering in the passages of the heel.

2. In a heel-attaching machine, awls, a support for a heel, a support for a shoe, means for driving fasteners into the heel-seat of the shoe and for leaving portions of said fasteners extending from said heel-seat, means for moving said awls predetermined distances into a heel mounted upon the heel-support to form passages in said heel, means for moving the heel-support away from the awls to a predetermined position adjacent to the shoe-support, and means for moving the shoe-support toward the heel-support thus positioned to force the nails projecting from the heel-seat of the shoe into the passage of the heel and the heel-seat of the shoe with attaching pressure against the heel.

3. In a heel-attaching machine, pricking-mechanism, shoe positioning and supporting means, heel positioning and supporting means, a nailing die, a movable carrier upon which the nailing die and the heel positioning and supporting means are mounted, means for moving the carrier to one position, in which the heel positioning and supporting means is arranged opposite the pricking mechanism and in which the nailing die is arranged adjacent to the shoe positioning and supporting means, and to a second position in which the heel positioning and supporting means is arranged adjacent to the shoe positioning and supporting means, a nail driver movable in the nailing die, means for simultaneously operating the pricking mechanism, the shoe positioning and supporting means and the nail driver when the carrier is in said one position to form passages in a heel on the heel positioning and supporting means and to drive into the heel-seat of the shoe upon the shoe positioning and supporting means nails which project beyond the heel-seat of the shoe, and means for moving the shoe positioning and supporting means relatively to the heel positioning and supporting means when the carrier is in said second position to attach the heel on said heel positioning and supporting means to the shoe with the portions of the nails projecting from the heel-seat of the shoe registering in the passages in the heel.

4. In a heel-attaching machine, a shoe-support, heel-pricking mechanism, a movable carrier, a heel-support, fastener-inserting mechanism, said support and said fastener-inserting mechanism being mounted upon the carrier, and means for moving the carrier to and from an operative position in which the heel support and the fastener-inserting mechanism are arranged opposite the pricking mechanism and the heel support respectively.

5. In a heel-attaching machine, a shoe-support, heel-pricking mechanism, a carrier movable between two operating positions, a heel-support, fastener-inserting mechanism, said heel-support and said fastener-inserting mechanism being mounted upon the carrier for presentation to the pricking mechanism and shoe-support respectively simultaneously when the carrier is at one of said positions, movement of the carrier to the other operating position shifting the heel-support into co-operation with the shoe-support, and means for moving the carrier between said positions.

6. In a heel-attaching machine, a shoe-support, heel-pricking mechanism, fastener-delivering mechanism, a carrier movable between two operating positions, a heel-support, fastener-inserting mechanism mounted upon the carrier for presentation to the pricking mechanism and shoe-support respectively simultaneously when the carrier is at one of said positions, movement of the carrier to the other position shifting the heel-support into co-operation with the shoe-support and the fastener-inserting mechanism into co-operation with the fastener-delivering mechanism, and means for moving the carrier between said positions.

7. In a heel-attaching machine, a shoe-support, heel-pricking mechanism, a carrier movable between two operating positions, a heel-support, fastener-inserting mechanism, said heel-support and fastener-inserting mechanism being mounted upon the carrier for presentation to the pricking mechanism and shoe-support respectively simultaneously when the carrier is at one of said positions, movement of the carrier to the other operating position shifting the heel-support into co-operation with the shoe-support, and means for producing relative movement between the heel-support and shoe-support to apply pressure to the work.

8. In a heel-attaching machine, a heel-support and fastener-inserting mechanism movable between two positions, a shoe-support with which the heel-support co-operates in one position, pricking mechanism with which said heel-support co-operates in the other position, the fastener-inserting mechanism at this time co-operating with the shoe-support, and means actuated by the operator to apply pressure between the pricking mechanism and the supported heel and between the supported shoe and the fastener-inserting mechanism.

9. In a heel-attaching machine, a heel-support and fastener-inserting mechanism movable between two positions, a shoe-support with which the heel-support co-operates in one position, pricking mechanism with which said heel-support co-operates in the other position, the fastener-inserting mechanism at this time co-operating with the shoe-support, and a member movable by the operator to apply pressure between the pricking mechanism and the supported heel and between the supported shoe and the fastener-inserting mechanism, further movement of the member by the operator causing the application of pressure under the power of the machine between the pricking mechanism and the supported heel together with the pricking of the heel and between the shoe and fastener-inserting mechanism together with the insertion of the fasteners in the heel-seat of the shoe.

10. In a heel-attaching machine, a heel-support movable between two operating positions, a shoe-support movable at one operating position toward and from the heel-support, a member through which the shoe-support is moved, pricking mechanism at the second position, said mechanism including a movable member for clamping a heel upon its support, and means for communicating to the clamping member the movement of the shoe-support-moving member.

11. In a heel-attaching machine, a heel-support movable between two operating positions, a shoe-support movable at one operating position toward and from the heel-support, a member through which the shoe-support is moved, pricking mechanism at the second position, said mechanism including a movable member for clamping the heel upon its support, and means including a two-part link and spring for yieldably communicating to the clamping member the movement of the shoe-support-moving member.

12. In a heel-attaching machine, a shoe-support, pricking mechanism, a heel-support movable into co-operation with either the shoe-support or pricking mechanism, said heel-support having a heel-holder movable upon it between heel-receiving and operating positions, and means for locking the heel-holder in operating position upon the heel-support and for maintaining it locked while said support is removed from the pricking mechanism.

13. In a heel-attaching machine, a shoe-support, pricking mechanism, a heel-support movable into co-operation with either the shoe-support or pricking mechanism, said heel-support having a heel-holder movable upon it between heel-receiving and operating positions, a member movable by the operator in starting power-operation of the machine, and means for locking the starting member against movement when the heel-holder is out of operating position.

14. In a heel-attaching machine, a shoe-support, pricking mechanism, a heel-support movable into two operating positions in which it is in co-operation with the shoe-support or the pricking mechanism, said heel-support having a heel-holder movable upon it between heel-receiving and operating positions, means for locking the heel-holder in operating position upon the heel-support and for maintaining it locked while said support is removed from the pricking mechanism, a member movable by the operator in starting power-operation of the machine, and means for locking the starting member against movement when the heel-support is in its operative position in cooperation with the pricking mechanism and the heel-holder is out of its operating position upon the heel-support.

15. In a heel-attaching machine, a shoe-support, pricking mechanism, a heel-support movable into co-operation with either the shoe-support or pricking mechanism, said heel-support having a heel-holder movable upon it between heel-receiving and operating positions, a lock for the heel-holder, and means for releasing the lock as the heel-holder moves into co-operation with the pricking mechanism.

16. In a heel-attaching machine, a shoe-support, pricking mechanism, a heel-support movable into two operating positions in which it is in co-operation with the shoe-support or the pricking mechanism, said heel-support having a heel-holder movable upon it between heel-receiving and operating positions, a member movable into and out of locking relation to the heel-holder, a member movable by the operator in starting the power-operation of the machine, and means connected to the locking member for locking the starting member against movement when the heel-support is in its operative position in co-operation with the pricking mechanism and the locking member is out of locking relation to the heel-holder.

17. In a heel-attaching machine, a shoe-support, pricking mechanism, a heel-support movable into co-operation with either the shoe-support or pricking mechanism, said heel-support having a heel-holder movable upon it between heel-receiving and operating positions, a member movable by the operator in starting power-operation of the machine, a locking bar for the heel-holder, a locking bar for the starting member, a lever engaging the holder-locking bar, and a lever engaging the locking bar for the starting member, the levers having portions engaging each other during the movement of the heel-support to cause movement of the locking bar for the heel-holder.

18. In a heel-attaching machine, a shoe-support, pricking mechanism, a heel-support movable into two operating positions in which it is in co-operation with the shoe-support or the pricking mechanism, said heel-support having a heel-holder movable upon it between heel-receiving and operating positions, a member movable by the operator in starting power-operation of the machine, a locking bar for the heel-holder, a locking bar for the starting member, a lever engaging the holder-locking bar, and a lever engaging the locking bar for the starting member, the levers having portions engaging each other while the heel-support is in its operative position in co-operation with the pricking mechanism and the heel-holder is out of its operative position upon the heel-support to prevent movement of the locking bar for the starting member.

19. In a heel-attaching machine, a support for a shoe, mechanism for inserting fasteners into the heel-seat of a shoe on the support, mechanism for supporting a heel, mechanism for alternately moving the fastener inserting mechanism and the heel supporting mechanism into operative position adjacent to the shoe support, means for operating the shoe support to force against said fastener inserting mechanism the heel-seat of the shoe positioned between the shoe support and the fastener inserting mechanism preparatory to inserting fasteners into the heel-seat of the shoe and also for operating the shoe support to force together the shoe and the heel between the shoe support and the heel support for attaching the heel to the shoe, and means for producing a different pressure upon the shoe and the heel during the heel attaching operation than is produced on the shoe during the fastener inserting operation.

20. In a heel-attaching machine, a support for a shoe, mechanism for inserting fasteners into the heel-seat of a shoe on the support, mechanism for supporting a heel, means for moving in predetermined paths the fastener inserting mechanism and the heel supporting mechanism alternately into operative position adjacent to the shoe support, means for operating the shoe support to force against said fastener inserting mechanism the heel-seat of the shoe positioned between the shoe support and the fastener inserting mechanism preparatory to inserting fasteners into the heel-seat of the shoe and also for operating the shoe support to force together the shoe and the heel between the shoe support and the heel support for attaching the heel to the shoe, means for producing a different pressure upon the shoe and the heel during the heel attaching operation than is produced on the shoe during the fastener inserting operation, and means movable in response to movement of said mechanism in said paths for controlling changes of pressure on the work during the fastener inserting and heel attaching operations.

21. In a heel-attaching machine, a support for a shoe, mechanism for inserting fasteners into the heel-seat of a shoe on the support, mechanism for supporting a heel, means for alternately moving the fastener inserting mechanism and the heel supporting mechanism into operative position adjacent to the shoe support, means for operating the shoe support to force against said fastener inserting mechanism the heel-seat of the shoe positioned between the shoe support and the fastener inserting mechanism preparatory to inserting fasteners into the heel-seat of the shoe and also for operating the shoe support to force together the shoe and the heel between the shoe support and the heel support for attaching the heel to the shoe, and means for varying the amount of pressure applied to the shoe and the heel during the heel attaching operation.

22. In a heel-attaching machine, a shoe-support, fastener-inserting mechanism, heel-supporting mechanism, said mechanisms being movable to present either to the shoe-support, a pressure member movable to urge the shoe-support successively toward the fastener-inserting mechanism and toward the heel-supporting mechanism, members connecting the pressure member to the shoe-support, certain of said members being movable into and out of engagement with each other, and means for producing such engaging movement for the two mechanisms after different extents of movement of the pressure member.

23. In a heel-attaching machine, a shoe-support, fastener-inserting mechanism, heel-supporting mechanism, a carrier for the mechanisms movable to present either to the shoe-support, a pressure-lever and a shoe-support-actuating lever movable to force the shoe-support toward the two mechanisms, means for connecting the levers to move together, means mounted upon one of the levers for preventing the engagement of the connecting means, and means mounted upon the carrier for rendering the engagement-preventing means ineffective when the heel-supporting mechanism co-operates with the shoe-support.

24. In a heel-attaching machine, a shoe-support, fastener-inserting mechanism, heel-supporting mechanism, a carrier for the mechanisms movable to present either to the shoe-support, a pressure-lever and a shoe-support-actuating lever movable to force the shoe-support toward the two mechanisms, means for connecting the levers to move together, a member movable upon the pressure-lever for disengaging the connecting means, a control-pawl pivoted upon the pressure-lever and contacting with the member to hold it in its disengaging relation, and a member mounted upon the carrier to shift the controlling pawl and free the disengaging member to permit the connecting means to act.

25. In a heel-attaching machine, a shoe-support, fastener-inserting mechanism, heel-supporting mechanism, a carrier for the mechanisms movable to present either to the shoe-support, a pressure-lever and a shoe-support-actuating lever movable to force the shoe-support toward the two mechanisms, means for connecting the levers to move together, a member movable upon the pressure-lever for disengaging the connecting means, a control-pawl pivoted upon the pressure-lever and contacting with the member to hold it in its disengaging relation, and means acting in the movement of the pressure-lever to shift the control-pawl and free the disengaging member to permit the connecting means to act.

26. In a heel-attaching machine, a shoe-support, fastener-inserting mechanism, heel-supporting mechanism, a carrier for the mechanisms movable to present either to the shoe-support, a pressure-lever and a shoe-support-actuating lever movable to force the shoe-support toward the two mechanisms, means for connecting the levers to move together, a member movable upon the pressure-lever for disengaging the connecting means, a control-pawl pivoted upon the pressure-lever and contacting with the member to hold it in its disengaging relation, means acting in the movement of the pressure-lever to shift the control-pawl and free the disengaging member to permit the connecting means to act, and means arranged to vary the time in the movement of the pressure-lever that the disengaging member is freed.

27. In a heel-attaching machine, a shoe-support, fastener-inserting mechanism, heel-supporting mechanism, a carrier for the mechanisms movable to present either to the shoe-support, a pressure-lever and a shoe-support-actuating lever movable to force the shoe-support toward the two mechanisms, the pressure-lever having an actuating pawl and the shoe-supporting lever having ratchet-teeth for engagement by the pawl to cause the levers to move together, a slider on the pressure-lever by which the actuating pawl may be disengaged from the ratchet-teeth, a control-pawl pivoted upon the pressure-lever for engagement with the slider to hold it in disengaging relation, a cam mounted upon the carrier and acting upon the control-pawl to free the slider promptly in the work-pressing movement of the levers when the heel-supporting mechanism co-operates with the shoe-support, and means acting upon the control-pawl to delay the freeing of the slider when the fastener-inserting mechanism co-operates with the shoe-support.

THOMAS BAGGOTT CLARKE.
ARTHUR ALAN RIVINGTON.

REFERENCES CITED

The following references are of record in the file of this patent:

UNITED STATES PATENTS

| Number | Name | Date |
|---|---|---|
| 611,370 | Winter | Sept. 27, 1898 |
| 1,077,929 | Glidden | Nov. 4, 1913 |
| 1,338,013 | Haahr | Apr. 27, 1920 |
| 2,391,543 | Carr | Dec. 25, 1945 |